United States Patent [19]

O'Gorman

[11] Patent Number: 5,781,658

[45] Date of Patent: Jul. 14, 1998

[54] METHOD OF THRESHOLDING DOCUMENT IMAGES

[75] Inventor: Lawrence Patrick O'Gorman, Madison, N.J.

[73] Assignee: Lucent Technologies, Inc., Murray Hill, N.J.

[21] Appl. No.: 694,807

[22] Filed: Aug. 9, 1996

Related U.S. Application Data

[63] Continuation of Ser. No. 224,446, Apr. 7, 1994, abandoned.

[51] Int. Cl.$^6$ ........................................... G06T 5/40
[52] U.S. Cl. ........................................ 382/172; 382/271
[58] Field of Search ................................ 382/237, 270, 382/271, 272, 273, 168, 171, 172; 358/465, 466

[56] References Cited

U.S. PATENT DOCUMENTS

| | | | |
|---|---|---|---|
| 4,504,972 | 3/1985 | Scherl et al. | 382/51 |
| 4,673,977 | 6/1987 | Stelzenmuller | 382/270 |
| 4,879,753 | 11/1989 | El-Sherbini | 382/270 |
| 5,073,954 | 12/1991 | Van Tyne et al. | 382/18 |
| 5,179,599 | 1/1993 | Formanek | 382/51 |
| 5,450,502 | 9/1995 | Eschbach et al. | 382/169 |

OTHER PUBLICATIONS

Liu et al. "An Object Attribute Thresholding Algorithm for Document Image Binarization." Proc. Second Int. Conf. on Document Analysis and Recognition. Oct. 1993, pp. 278–281.

J. M. White, G. D. Rohrer, "Image Thresholding for Optical Character Recognition and Other Applications Requiring Character Image Extraction", *IBM J. Res. Develop.*, vol. 27, No. 4, Jul. 1983, pp. 400–411.

T. Pun, "Entropic Thresholding, A New Approach", *Computer Graphics and Image Processing*, vol. 16, pp. 210–239 (1981).

J. N. Kapur, P. K. Sahoo, A. K. C. Wong, "A New Method for Gray–Level Picture Thresholding Using the Entropy of the Histogram", *Computer Vision, Graphics, and Image Processing*, vol. 29, pp. 273–285 (1985).

W–Hsiang Tsai, "Moment–Preserving Thresholding: A New Approach", *Computer Vision, Graphics and Image Processing* vol. 29, pp. 377–393 (1985).

N. Otsu, "A Threshold Selection Method from Gray–Level Histograms", *IEEE Transactions on Systems, Man, and Cybernetics*, vol. SMC–9, pp. 62–66, Jan. 1979.

*Primary Examiner*—Michael T. Razavi
*Assistant Examiner*—Jon Chang

[57] ABSTRACT

A method of multithresholding a document image considers both local and global information in determining the number of thresholded levels contained in a gray-scale image. A gray-scale image is comprised of a plurality of pixels. Each pixel has an intensity value. Local regions of pixels having similar intensity values are identified and compiled into a global representation of the image. Intensity ranges are identified in the global representation in which the number of regions of pixels are approximately constant. An intensity value is identified within each range which represents the most constant point within the representation range. The number of threshold levels is set equal to the number of ranges in the representation.

12 Claims, 3 Drawing Sheets

METHOD OF THRESHOLDING DOCUMENT IMAGES

This is a Continuation of application Ser. No. 08/224,446 filed Apr. 7, 1994, now abandoned.

BACKGROUND OF THE INVENTION

The present invention relates to a method of processing document images and, more particularly, to a method of multi-thresholding a document image. For the convenience of the reader, a glossary is appended to the end of the specification.

Traditionally, paper documents have been used to transmit and store information. As computers and scanners become less expensive and more powerful, electronic storage, transmission and reproduction of documents is gaining in popularity. However, electronic documents must be processed in such a way that when they are reproduced, they closely resemble corresponding paper documents, and will therefore be accepted by a human user. For example, if a page of text is scanned into a system, the text must be readable to the human user and not be subjected to distortion, such as characters improperly connected or fragmented.

In general, data contained in paper documents is captured by optical scanning. Scanning generates signals indicative of the intensity value of sampled image elements known as pixels. The pixels are generally described by data having ON (1) and OFF (0) values for binary images, such as those containing only text, and 0–255 values for gray-scale images, such as those containing pictures. The pixel data are then processed so that further analysis may be performed on the image. One such pixel process which is performed is the thresholding of a gray-scale image or color image to an image that contains significantly fewer intensity or "information" levels, such as a binary image or a multiple level image.

Thresholding is a known image processing operation applied to gray-scale document images to obtain binary intensity level images or multiple intensity level (multi-level) images, where the number of levels is much fewer than in the original image. A gray-scale image typically has a large range of intensity values, e.g., 256 values, but usually far fewer levels of information. For example, a page of magazine text has two levels of information; black text and the white background. However a gray-scale image of the same page will have many more intensity values due to factors, such as non-uniform printing of characters contained in the text and shadows caused by lighting effects. Other types of documents, such as journal covers, generally include multiple levels of information, e.g., multiple colors which are used both in the text and background of the document page. If the document page is converted to a gray-scale image, each color on the page is represented by multiple intensity values. Proper thresholding therefore requires both proper selection of the number of thresholds needed to represent the number of levels of information and also the selection of the optimum values for these thresholds.

A thresholded image should result in an image which, if viewed electronically, would be consistent with a paper document of the same image. One purpose of thresholding is to realize an image that can be efficiently stored for future access and reading. Another purpose is to yield an image suitable for optical character recognition (OCR). Both of these purposes require that the thresholded image be of high quality for legibility of reading and best recognition by an OCR system.

A method generally used to process an image containing two levels of information is binarization. However, binarization is inadequate for documents which contain more than two levels of information. For these multi-level images, known multi-level thresholding methods exist in which the number of threshold levels must be preselected, thereby limiting the number of thresholds identified. However, a problem arises in situations where three thresholds levels are predefined and the document image to be thresholded contains four threshold levels. These techniques will not identify the fourth level.

Known global techniques for thresholding multi-level images compile image representations in the form of intensity histograms which represent the number of pixels at each of the intensity values in the image. See, e.g., N. Otsu, "A Threshold Selection Method from Gray-Level Histograms", IEEE Trans. Systems, Man, and Cybernetics, Vol. SMC-9, No. 1, Han. 1979, pp. 62–66. Peaks in the intensity histogram indicate that a large number of pixels have the same intensity value and therefore correspond to a particular information level. Thresholds are determined from the intensity histogram by calculating a measurement which best separates the peaks.

These global techniques do not consider local information which describe the relationship of intensity levels of one or more adjacent pixels within a predefined area of the image. As a consequence, images processed by the above-described thresholding techniques may be distorted as a result of image regions, e.g., text characters, being either improperly connected or disconnected. As a result, certain applications, such as OCR, will have a lower rate of recognition. For example, if a threshold value is set too low, the characters "rn" may become connected, resulting in the OCR incorrectly recognizing the character "m." If a threshold value is set too high, the horizontal stroke in the letter "e" may be lost in binarization and, as a result, the OCR may incorrectly recognize the character as the letter "c."

Known local thresholding techniques consider information which describes the similarity of intensity values among adjacent or nearby pixels. Local information includes factors such as the edge definition of individual characters and the manner in which characters are connected or disconnected, also referred to as connectivity. See, e.g., J. M. White and G. D. Rohrer, "Image Thresholding for Optical Character Recognition and Other Applications Requiring Character Image Extraction," IBM J. Res. Development, Vol. 27, No. 4, July 1983, pp. 400–411. Local techniques have an advantage over global techniques in that the local techniques recognize that pixels of a particular threshold level usually occur as connected groups of pixels used to form characters and other types of regions. However, a disadvantage of the local techniques as compared with the global techniques is that fewer pixels are considered for each local thresholding decision, i.e. local groups of pixels. As a result, the presence of noisy values can cause erroneous results. In contrast, since the global methods consider all of the pixels contained in the image for a global thresholding decision, the noisy pixels usually comprise a small percentage of the total number of pixels and do not greatly impact on the thresholding result. There is a continuing need in the industry for thresholding methods that more accurately define the number of threshold levels needed for accurately recording a like number of levels of information on a document, and for determining the optimum threshold values for each threshold level.

SUMMARY OF THE INVENTION

In accordance with the present invention, a method of multi-thresholding a document image has been realized which considers both local and global information in determining the number of thresholded levels contained in a gray-scale image.

A gray-scale image is comprised of a plurality of pixels. Each pixel has an intensity value. Local regions of pixels having intensity values above a given intensity value are identified for each intensity value contained in the gray-scale image and compiled into a global representation of the image. Intensity ranges are identified in the global representation in which the intensity values of the pixel are approximately constant. A threshold value is identified within each range which represents the most constant point within the representation range. The number of threshold levels is set equal to the number of ranges in the representation.

The present invention considers both global and local information to identify connected pixels of similar intensity which are then considered in determining both the number of threshold levels and the value of each threshold level. The connected regions are preserved and they are differentiated from their background regions, thereby ensuring that any text contained within the scanned document is not distorted or improperly connected.

DETAILED DESCRIPTION

Figure 1:
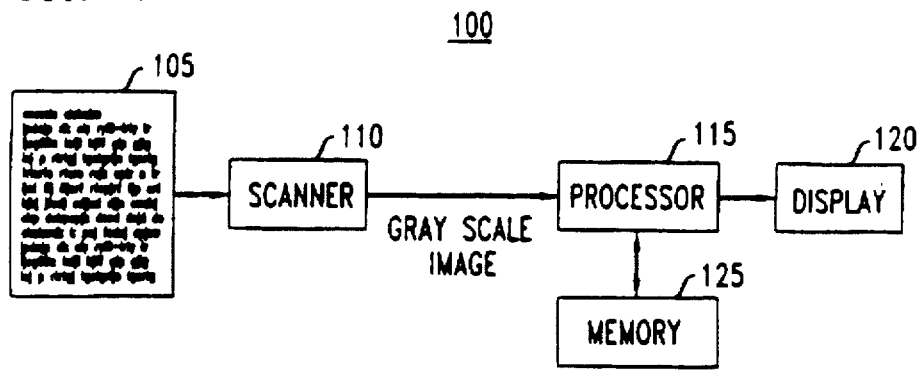
FIG. 1 illustrates a block diagram of a multi-thresholding document system in accordance with the present invention.

FIG. 1 illustrates a multi-thresholding document system 100 which incorporates the principles of the present invention. The multi-thresholding document system 100 may illustratively be a system for electronically storing documents, such as journals, magazines, newspapers or books. A document 105 which is to be entered into the system 100 is scanned by scanner 110. Scanner 110 converts document 105 into digital image signals to create a gray-scale image. The gray-scale image is received by a processor 115 which determines the number of threshold levels contained within the gray-scale image in a manner which will be described in detail below. The digital image signals representing the thresholded images are stored in memory 125. The thresholded images can be retrieved from memory 125 and viewed on display 120 or a hard copy may be obtained by printing the image using a printer (not shown).

In operation, a user of the system 100 may search the document images using various searching techniques, such as formulating a search request by inputting key words using a keyboard (not shown). Document images containing the key words are identified by the processor 115 and a listing of the document images is shown on display 120. The user may then view one of the document images by inputting the appropriate command. The requested document image is retrieved from memory 125 and shown on the display 120.

Figure 2:
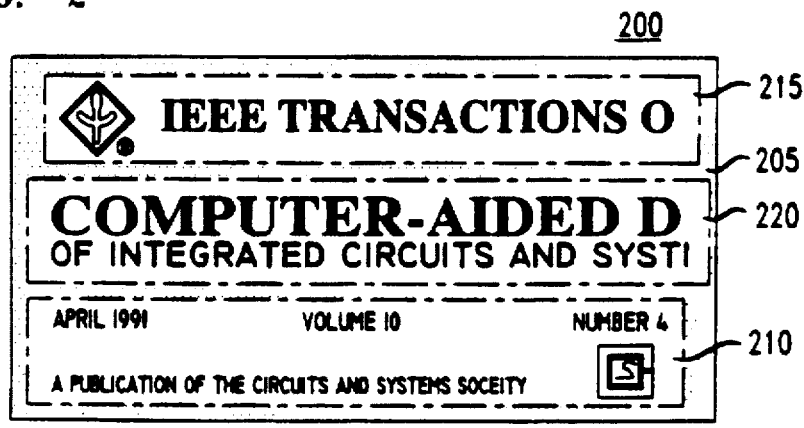
FIG. 2 illustrates a section of a document page containing multiple information levels.

The retrieved document images may be binary level images which contain two levels of information, or multi-level images which contain greater than two levels of information. An example of a document page 200 is illustrated in FIG. 2. Document page 200 represents a journal cover which comprises three levels of information. The first level of information is the background 205 which is printed in a first color, illustratively blue. The second level of information includes text sections 210 and 215 which are printed in a second color, illustratively black. The third level of information includes text section 220 which is printed in a third color, illustratively white.

Figure 3:
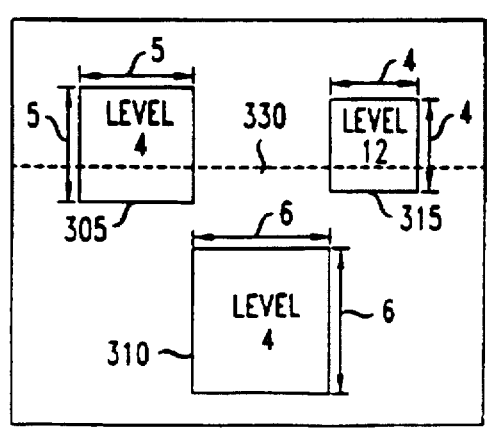
FIG. 3 illustrates a gray-scale image having three regions.

When scanned by scanner 105, a document of the type shown in FIG. 2 is converted to a gray-scale image having three dominant gray-scale levels which correspond to each of the colors of the document. The threshold levels contained within the gray-scale image are identified by considering both global and local information. FIG. 3 illustrates a gray-scale image 300 comprised of a plurality of pixels. Each pixel has an intensity value. Groups of pixels having similar intensity values are identified as connected regions. Image 300 is comprised of three pixels regions which contain pixels having similar intensity values. Pixel region 305 is comprises an area of 5 pixels×5 pixels and has an intensity value of 4. Pixel region 310 comprises an area of 6 pixels×6 pixels and has an intensity value of 4. Pixel region 315 comprises an area of 4 pixels×4 pixels and has an intensity value of 12.

Figure 4:
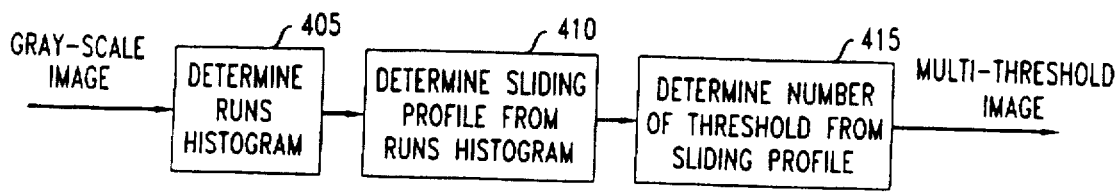
FIG. 4 illustrates a block diagram illustrating the steps for thresholding a gray-scale image in accordance with the present invention.

FIG. 4 is a block diagram illustrating a method for thresholding the gray-scale image of FIG. 3. A global representation of the gray-scale image is created by determining a "runs" histogram (step 405). A run is a group of connected pixels of the same or similar intensity values identified within the image. For example, a run may be a portion of a row or column or may be a region which is specified by a particular area of the image. Next a sliding profile is determined from the runs histogram (step 410). The sliding profile yields a measurement of "flatness" or the lack of variation of runs for ranges around each intensity level represented by the runs histogram. Next, the number of thresholds are determined from the sliding profile (step 415). The number of thresholds is equal to the number of peaks in the sliding profile that reach, or are close to reaching, the maximum.. Each of the steps for thresholding a gray-scale image will be described in more detail using the image depicted in FIG. 3.

In accordance with the present invention, the runs histogram is generated by determining the number of runs at each given threshold level in the image. The intensity value for each pixel within the image is identified in raster scan order. For a given row within the image, such as the row indicated by dotted line 330 in the image of FIG. 3, each pixel is inspected to identify its intensity value. Intensity values for adjacent pixels which become successively larger indicate the beginning of a run. Likewise, adjacent pixels which successively decrease in value indicate the end of a run.

Figure 6:
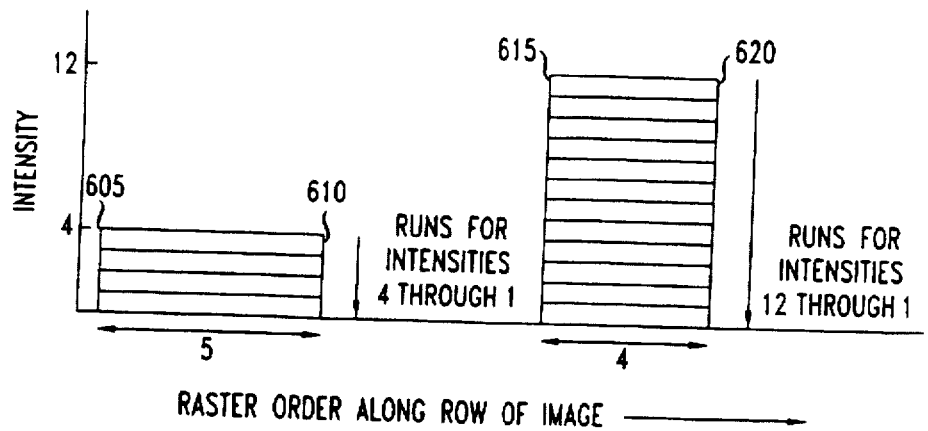
FIG. 6 illustrates an intensity cross section along a row of the image of FIG. 3.

FIG. 6 illustrates an intensity cross-section for the row 330 of image 300. The intensity cross-section shows the intensity value for each pixel along the row. The intensity level first increases to intensity level 4 at 605 when pixel region 305 is first reached. As indicated by the cross-section, runs for intensity levels 1, 2, and 3 are also initiated. The plot stays at intensity level 4 until the end of pixel region 305 is detected as indicated at 610. The end of pixel region 305 also indicates the end of each of the runs for intensity levels 1–4 since the pixel region 305 is adjacent the background which is assumed to have an intensity level of 0.

Next, the intensity level increases to 12 at 615 when pixel region 315 is first reached. As indicated by the cross-section, runs for intensity levels 1–11 are also initiated. The plot stays at intensity level 12 until the end of pixel region 315 is detected as indicated at 620. The end of pixel region 315 is adjacent the background.

Figure 5:
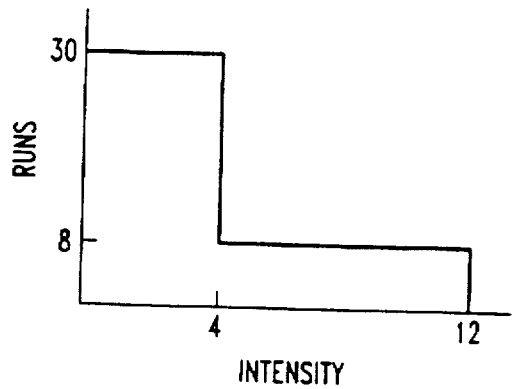
FIG. 5 illustrates a runs histogram for the image of FIG. 3.
Figure 7:
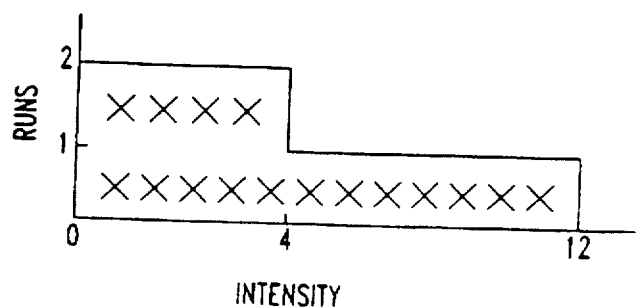
FIG. 7 illustrates a runs histogram for the row illustrated in FIG. 6.

FIG. 7 illustrates the runs histogram for row 330. As shown, two runs exist between intensity levels 0 and 4, and one run exists between intensity levels 4 and 12. An accumulated runs histogram is compiled for image 300 by identifying the runs in each row and each column of the image. FIG. 5 illustrates a runs histogram for image 300. Thirty runs are identified as having intensities lower than intensity level 4 since each row and column for each pixel region has an intensity level of 4 or greater (i.e., 5+5+4+4+ 6+6). Eight runs are identified as having intensity levels between intensity level 4 and intensity level 12. No runs exist which have a intensity level greater than intensity level 12.

Threshold values are determined from the runs histogram by identifying ranges on the runs histogram in which the runs remain most constant. These ranges are represented by the flat portions of the runs histogram. Referring to FIG. 7, the number of thresholds detected is equal to two as indicated by the two flat ranges. A first threshold value would be chosen which would fall between intensity level 0 and intensity level 4. A second threshold level would be chosen which would fall between intensity level 4 and intensity level 12.

The measurement of the flat ranges in the runs histogram may be determined in a number of ways. In accordance with the present invention, a sliding profile is determined from the runs histogram (step 410 of FIG. 4). The sliding profile yields a measurement of "flatness" or the lack of variation of runs for ranges around each intensity level represented by the runs histogram. The sliding profile plots profile values P(i), which correspond to an expected flatness deviation ΔF, as a function of the intensity value contained in the runs histogram. These flat ranges correspond to intensity value ranges in which the runs remain constant. This indicates that the runs are clearly defined in these ranges and that the intensities within each range are between region intensities. If a threshold is identified within each range, the regions separated by these ranges would be identified.

The sliding profile is illustratively computed by using a window which slides along the vertical axis of the runs histogram and which centers on the intensity value of each pixel in the image. The computations indicate flat ranges in the runs histogram. When the vertical axis is at an intensity level such that the window contains only a flat range, the resulting profile value at that intensity level is maximum. When the vertical axis is at an intensity level such that the window contains more than one flat range or a transition between ranges, the resulting profile value at that intensity level is less than maximum. Maximum values on the sliding profile correspond to flat ranges on the runs histogram. Threshold values are selected as the maximum within each profile peak.

Figure 9:
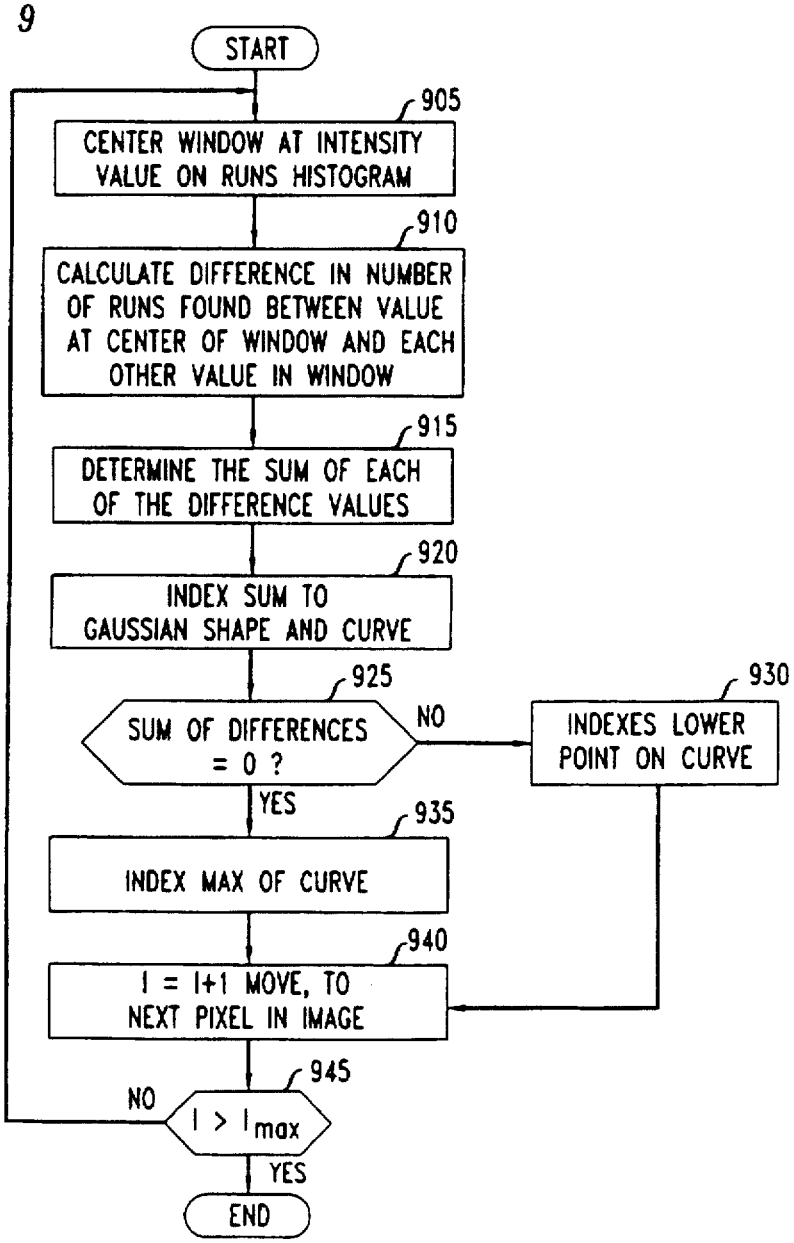
FIG. 9 illustrates a flow chart depicting the computation of the sliding profile.

FIG. 9 illustrates a flow chart depicting the computation of the sliding profile in more detail. First, a window size is selected which is centered at each intensity level on the runs histogram (step 905). The window size is dependent on a minimum contrast user parameter which specifies the minimum distance between intensity levels. This parameter is illustratively expressed as a percentage of the difference between threshold levels and is preferably as large as possible so that any noise present in a generally flat intensity level range is averaged out. However, the parameter should not be larger than the minimum intensity value difference between different threshold levels such that the window causes averaging to occur between different threshold levels. Illustratively, the parameter is set to 10%. The window width is determined by the following equation:

$$w = \frac{c^* w_h}{100} = \frac{cI}{100} \tag{1}$$

where w=window width c=minimum contrast parameter [%]

I=maximum possible intensity value in original image

Next, the sliding profile is calculated from the runs histogram in the following way. A calculation is made of the difference in the number of runs by determining the difference between the number of runs at the center intensity of the window and each other number of runs for all other values contained in the window. The differences are then summed which provides a flatness measurement for the pixel located at the center of the window. The flatness measurement is determined by the following equation:

$$d_i = \sum_{j=-w/2}^{w/2} |R(i) - R(j)| \text{ for } i = 1, \ldots I \tag{2}$$

where $d_i$=sum of differences within a window at intensity i w=window width i,j=intensities R(i)=number of runs at intensity i I=maximum possible intensity value in original image The sum of differences is used to index a Gaussian shaped curve which provides the resultant profile value. The profile value is determined as follows:

$$P(i) = \exp\left(-\frac{1}{2}\left(\frac{d_i}{\sigma}\right)^2\right) \tag{3}$$

where

P(i)=profile value at intensity level i $d_i$=sum of differences within window

σ=standard deviation of Gaussian shaped curve

The standard deviation σ is chosen based on the image characteristics. The standard deviation enables the thresholding method to be adaptive for varying degrees of non-flatness in the runs histogram or varying degrees of non-uniformity in intensity values in a single image region. This non-uniformity is generally due to noise which causes an image region to have a range of intensity values which is distributed in a Gaussian-like fashion around the average value. As such, if it is predicted that uniform regions will have a high level of deviation, a larger value a is used and vice versa.

Figure 8:
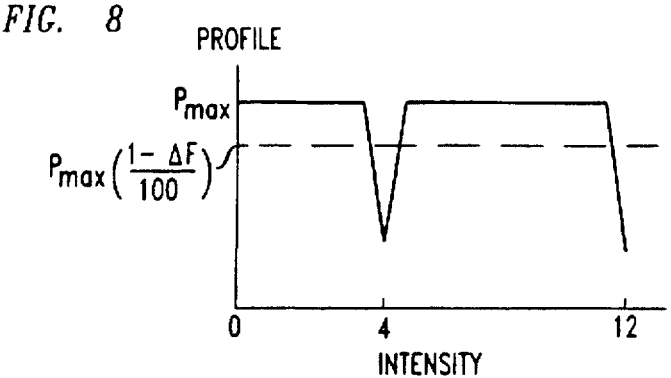
FIG. 8 illustrates a sliding profile derived from the runs histogram of FIG. 3.

A sliding profile for the runs histogram shown in FIG. 5 is illustrated in FIG. 8. Two peaks are shown in the sliding profile. Next, the number of thresholds are determined from the sliding profile (step 415 of FIG. 4). In general, the number of thresholds is equal to the number of peaks in the sliding profile that reach, or are close to reaching, the maximum. Referring to FIG. 3, there are two flat ranges in the runs histogram which are perfectly flat, resulting in two sliding profile peaks which reach maximum. In general, a scanned image will be subjected to variations in intensity values due to factors such as, but not limited to, noise, lighting and other effects which will cause the profile peaks to be less than maximum, and not completely flat. In such a case, the threshold level is selected from the flattest portion of the profile peak.

All ranges of intensity values for which the profile values are within an expected flatness deviation, $\Delta F$, indicate threshold ranges. The flatness deviation is defined as a percentage of the maximum profile value as follows:

$$\left\{ \{i\}_j \left( P(i) > P_{max}\left(\frac{1-\Delta F}{100}\right), \right) j=1,\ldots L \right\} \quad (4)$$

where

{i}$_j$=intensity level ranges
j=threshold range
$\Delta F$=flatness deviation
P(I)=profile value A threshold is chosen within each threshold range j as the intensity level indexing the maximum profile value. This indicates the intensity value centered on the flattest portion of the runs histogram within that particular intensity level range which may be expressed as:

$$T_j = \max P(i) \text{ for } i \epsilon i_j, j=1, \ldots L \quad (5)$$

where $T_j$=threshold values for j=1, . . . L threshold ranges

Modifications may be performed on the threshold values to account for noise and other limitations. Referring to FIG. 8, the number of thresholds detected is equal to 2 as indicated by the 2 peaks. A first threshold value would be chosen which would fall between intensity level 0 and intensity level 4. A second intensity level would be chosen which would fall between intensity level 4 and intensity level 12. These values would correctly threshold image 300.

Glossary of Terms

Binarization—a method of thresholding a gray-scale image to realize an image which contains two intensity levels Global Technique—a thresholding technique which selects thresholds based on all of the pixels in an image Intensity Histogram—a representation of the number of pixels with values at each intensity level Intensity Level—an information level which is perceived by the human eye as being at a single intensity value Intensity Value—the gray-scale value of a pixel having a blackness value between 0 (OFF=white) and 225 (ON=black)

Local Technique—a thresholding technique which selects thresholds at each pixel based on a local neighborhood around that pixel Pixel—image elements Run—a group of connected pixels above a given intensity level Runs Histogram—a representation of the number of runs at each intensity value within an image Sliding Profile—a representation of the lack of variation of runs at each intensity value represented by the runs histogram Threshold—an intensity value which is selected for a given image which best separates two levels of information which are contained in the image It will be appreciated that those skilled in the art will be able to devise numerous and various alternative arrangements which, although not explicitly shown or described herein, embody the principles of the invention and are within its scope and spirit.

I claim:

1. A method of thresholding a gray-scale image to obtain an image having at least two levels, the gray-scale image being realized from a digital image, said digital image being retrieved from a memory associated with a document system, said document system electrically storing a plurality of digital images which represent one or more documents, the gray-scale image being comprised of a plurality of pixels, each pixel having an intensity value, the method comprising the following steps performed by said document system:

identifying local groups of connected pixels within said gray-scale image having intensity values above a given intensity value, said identification determined for each intensity value contained in the gray-scale image;

compiling a global representation of the entire gray-scale image which represents the number of groups of connected pixels at each intensity value;

identifying intensity ranges within the global representation in which the number of the groups of pixels remain substantially constant;

determining the number of threshold levels to be equal to the number of ranges in the representation;

identifying a threshold value within each intensity range identified in the global representation which represents the most constant portion of the intensity range; and performing said thresholding of said gray-scale image utilizing the identified threshold values such that an image is obtained which closely resembles an original document for which the image represents.

2. The method according to claim 1 wherein said step of identifying intensity ranges within the representation comprises the steps of:

centering a window on each intensity value in the representation and determining the differences in value between the number of groups of pixels at the intensity value located at the center of the window and each of the other number of groups of pixels at all intensity values contained with the window, said differences being summed together to determine a difference sum for each intensity value located at the center of the window;

identifying difference sums which are above a predetermined value;

identifying ranges of difference sums which are above the predetermined value; and generating a profile of the difference sums as a function of intensity value.

3. The method according to claim 2 wherein said step of identifying a threshold value comprises the step of:

selecting a maximum value within each difference sum determined for a particular intensity value located at the center of the window and identified in the generated profile.

4. The method according to claim 1 wherein said global representation is a histogram which represents the number of groups as a function of intensity value.

5. The method according to claim 4 wherein each group comprises at least one run of connected pixels of similar intensity values.

6. The method according to claim 1 wherein each range represents a flat region in the representation.

7. A method of thresholding a gray-scale image to obtain an image having at least two levels, the gray-scale image being realized from a digital image, said digital image being retrieved from a memory associated with a document system, said document system electrically storing a plurality of digital images which represent one or more documents, the gray-scale image being comprised of a plurality of pixels, each pixel having an intensity value, the method comprising the following steps performed by said document system:

identifying groups of connected pixels having intensity values above a given intensity value, said identification determined for each intensity value contained in the gray-scale image;

compiling a global representation of the entire gray-scale image which represents the number of groups of connected pixels as a function of intensity value, said representation including flat ranges in which the number of groups remains substantially constant; and selecting a threshold value from each flat range at the flattest portion of each range; and performing said thresholding of said gray-scale image utilizing the selected threshold values such that an image is obtained which closely resembles an original document for which the image represents.

8. The method according to claim 7 wherein said step of selecting threshold values within the representation comprises the steps of:

centering a window on each intensity value in the representation and determining the differences in value between the number of groups of pixels at the intensity value located at the center of the window and each of the other number of groups of pixels at all intensity values contained within the window, said differences being summed together to determine a difference sum for each intensity value located at the center of the window;

identifying difference sums which are above a predetermined value;

identifying ranges of difference sums on the representation which are above the predetermined values;

generating a profile of the difference sums as a function of intensity value; and selecting a maximum value within each difference sum determined for a particular intensity value located at the center of the window and identified in the generated profile.

9. The method according to claim 7 wherein each group comprises at least one run of connected pixels of similar intensity values.

10. A method of thresholding a gray-scale image to obtain a multi-level image, the gray-scale image being realized from a digital image, said digital image being retrieved from a memory associated with a document system, said document system electrically storing a plurality of digital images which represent one or more documents, the gray-scale image being comprised of a plurality of pixels, each pixel having an intensity value, the method comprising the following steps performed by said document system:

identifying regions of connected pixels within the gray-scale image which have intensity values above a given intensity value, said identification determined for each intensity value contained in the gray-scale image;

creating a global representation of the entire gray-scale of the region of connected pixels which represents the number of said regions within the image as a function of intensity value;

centering a pixel window on each intensity value within the representation to identify flat ranges in the representation in which the number of regions remains substantially constant;

identifying one threshold value within each flat range which represents the flattest portion of the range; and determining the number of threshold levels to be equal to the number of identified ranges; and performing said thresholding of said gray-scale image utilizing the threshold levels such that an image is obtained which closely resembles an original document for which the image represents.

11. The method according to claim 10 wherein said global representation is a histogram which represents the number of regions as a function of intensity value.

12. The method according to claim 11 wherein each pixel region comprises at least one run of connected pixels of similar intensity values.

* * * * *